(12) United States Patent
Nakamura et al.

(10) Patent No.: US 6,668,087 B1
(45) Date of Patent: Dec. 23, 2003

(54) FILTER ARITHMETIC DEVICE

(75) Inventors: Tsuyoshi Nakamura, Fukuoka (JP);
Masahiro Oohashi, Fukuoka (JP);
Shunichi Kuromaru, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,101

(22) PCT Filed: Dec. 10, 1999

(86) PCT No.: PCT/JP99/06939

§ 371 (c)(1),
(2), (4) Date: Sep. 21, 2000

(87) PCT Pub. No.: WO00/35202

PCT Pub. Date: Jun. 15, 2000

(30) Foreign Application Priority Data

Dec. 10, 1998 (JP) ............................................. 10-351576

(51) Int. Cl.$^7$ ................................................. G06K 9/00
(52) U.S. Cl. .................. 382/236; 382/260; 375/240.13; 708/300
(58) Field of Search ................................. 382/236, 264, 382/254, 260, 261; 250/208.1; 375/240.1, 254, 240.13, 240.12, 240.29; 386/124; 348/400.1–421.1; 708/300, 313

(56) References Cited

U.S. PATENT DOCUMENTS

| | | | | |
|---|---|---|---|---|
| 4,328,426 A | * | 5/1982 | D'Ortenzio | ............... 250/208.1 |
| 5,170,249 A | * | 12/1992 | Ohtsubo et al. | ......... 348/222.1 |
| 5,428,456 A | * | 6/1995 | Parulski et al. | ............. 386/124 |
| 5,495,293 A | * | 2/1996 | Ishida | ......................... 348/500 |
| 5,619,267 A | | 4/1997 | Riegel et al. | |
| 5,805,227 A | * | 9/1998 | Gi-Hwan | ................ 375/240.17 |
| 5,825,418 A | * | 10/1998 | Song et al. | ............. 375/240.15 |
| 6,239,842 B1 | * | 5/2001 | Segman | ....................... 348/448 |
| 6,430,223 B1 | * | 8/2002 | Lim | ....................... 375/240.16 |

FOREIGN PATENT DOCUMENTS

| | | |
|---|---|---|
| EP | 0674444 A1 | 9/1995 |
| EP | 0739142 A2 | 10/1996 |
| JP | 6-113265 | 4/1994 |
| JP | 0651351 | 5/1995 |
| JP | 7-274165 | 10/1995 |
| JP | 8-79758 | 3/1996 |
| JP | 8-228353 | 9/1996 |
| WO | 96/17478 | 6/1996 |

OTHER PUBLICATIONS

Patent Abstracts of Japan, vol. 017, No. 665 (E–1472), Dec. 8, 1993 & JP 05 219498 A (Fujitsu Ltd), Aug. 27, 1993.
K. K. Pang et al., "Optimum Loop Filter in Hybrid Coders", IEEE Transaction on Circuits and Systems for Video Technology, IEEE Inc., New York, US, vol. 4, No. 2, Apr. 1, 1994, pp. 158–167, XP000489688, ISSN: 1051–8215.

* cited by examiner

Primary Examiner—Bhavesh M. Mehta
Assistant Examiner—Barry Choobin
(74) Attorney, Agent, or Firm—Wenderoth, Lind & Ponack, L.L.P.

(57) ABSTRACT

A filter operation apparatus according to the present invention involves a vertical and horizontal half-pixel motion compensation and vertical and horizontal intra-loop filtering means 100 comprising a first pixel delay means 200, a second pixel delay means 201, a multiplication means 202, a left shift means 203, a first selection means 204, an addition means 205, a second selection means 206, a selection control signal generation means 207, a third pixel delay means 208, a right shift means 209, and a shift amount control means 210.

The so-constructed operation apparatus can share an operation unit in a horizontal processing apparatus and a vertical processing apparatus in the processing of half-pixel motion compensation and intra-loop filtering for input pixel data, thereby reducing the scale of hardware.

3 Claims, 22 Drawing Sheets

| Fig.5 (a) CLOCK | ⎍⎍⎍⎍⎍⎍⎍⎍⎍⎍⎍ |
|---|---|
| Fig.5 (b) S1 | 1/2-pixel processing ON (select b) |
| Fig.5 (c) D1 | A \| B \| C \| D \| E \| F \| G \| H \| I \| J |
| Fig.5 (d) D2 | A \| B \| C \| D \| E \| F \| G \| H \| I |
| Fig.5 (e) D3 | 0 |
| Fig.5 (f) S2 | select b |
| Fig.5 (g) D4 | A+B \| B+C \| D+C \| E+D \| E+F \| F+G \| G+H \| H+I \| I+J |
| Fig.5 (h) S3 | horizontal processing ON (or vertical processing ON) |
| Fig.5 (i) S4 | 1-bit rightward |
| Fig.5 (j) D5 | (A+B)≫1 \| (B+C)≫1 \| (D+C)≫1 \| (E+D)≫1 \| (E+F)≫1 \| (F+G)≫1 \| (G+H)≫1 \| (H+I)≫1 |

| | t0 | t1 | t2 | t3 | t4 | t5 | t6 | t7 | t8 | t9 | t10 |
|---|---|---|---|---|---|---|---|---|---|---|---|
| Fig.6(a) CLOCK | | | | | | | | | | | |
| Fig.6(b) S1 | | intra-loop filtering ON (select a) | | | | | | | | | |
| Fig.6(c) D1 | | | A | B | C | D | E | F | G | H | I | J |
| Fig.6(d) D2 | | | | A≪1 | B≪1 | C≪1 | D≪1 | E≪1 | F≪1 | G≪1 | H≪1 | I≪1 |
| Fig.6(e) D3 | | | | | A | B | C | D | E | F | G | H |
| Fig.6(f) S2 | | | | select a | select b | | | | | | select a | |
| Fig.6(g) D4 | | | | 4A | A+(B≪1)+C | B+(C≪1)+D | C+(D≪1)+E | D+(E≪1)+F | E+(F≪1)+G | F+(G≪1)+H | 4H | 4I |
| Fig.6(h) S3 | | vertical processing ON | | | | | | | | | |
| Fig.6(i) S4 | | 0-bit rightward | | | | | | | | | |
| Fig.6(j) D5 | | | | | 4A | A+(B≪1)+C | B+(C≪1)+D | C+(D≪1)+E | D+(E≪1)+F | E+(F≪1)+G | F+(G≪1)+H | 4H |
| Fig.6(k) time | | | | | | | | | | | |

Fig.12 (a) CLOCK

Fig.12 (b) S41    half-pixel processing ON (select b)

Fig.12 (f) S42    Don't care · select b

Fig.12 (g) D44    | A+I | B+J | C+K | D+L | E+M | F+N | G+O | H+P | I+Q | J+R | K+S | S+T | T+U |

Fig.12 (h) S43    vertical processing ON (select b)

Fig.12 (i) S44    1-bit rightward

Fig.12 (j) D45    (A+I) (B+J) (C+K) (D+L) (E+M) (F+N) (G+O) (H+P) (I+Q) (J+R) (K+S) (S+T)
≫1 ≫1 ≫1 ≫1 ≫1 ≫1 ≫1 ≫1 ≫1 ≫1 ≫1 ≫1

Fig.12 (k) time → t0 t1 t2 t3 t4 t5 t6 t7 t8 t9 t10 t11 t12 t13 t14 t15 t16 t17 t18 t19 t20 t21

Fig.17 (a) PRIOR ART CLOCK

Fig.17 (b) PRIOR ART S21

| | t0 | t1 | t2 | t3 | t4 | t5 | t6 | t7 | t8 | t9 | t10 |
|---|---|---|---|---|---|---|---|---|---|---|---|
| Fig.17 (b) S21 | | select a | | | | | | | | | |
| Fig.17 (c) D21 | | | A | B | C | D | E | F | G | H | I | J |
| Fig.17 (d) D22 | | | | A | B | C | D | E | F | G | H | I |
| Fig.17 (e) S22 | | | | select b | | | | | | | |
| Fig.17 (f) S23 | | | | select b | | | | | | | |
| Fig.17 (g) D23 | | | | | A+B | B+C | D+C | E+D | E+F | F+G | G+H | H+I | I+J |
| Fig.17 (h) D24 | | | | | | A+B | B+C | D+C | E+D | E+F | F+G | G+H | H+I |
| Fig.17 (i) S24 | | | | | select a | | | | | | |
| Fig.17 (j) D25 | | | | | | 2(A+B) | 2(B+C) | 2(D+C) | 2(E+D) | 2(E+F) | 2(F+G) | 2(G+H) | 2(H+I) |
| Fig.17 (k) D26 | | | | | | | 2(A+B) | 2(B+C) | 2(D+C) | 2(E+D) | 2(E+F) | 2(F+G) | 2(G+H) |
| Fig.17 (l) time | t0 | t1 | t2 | t3 | t4 | t5 | t6 | t7 | t8 | t9 | t10 |

PRIOR ART

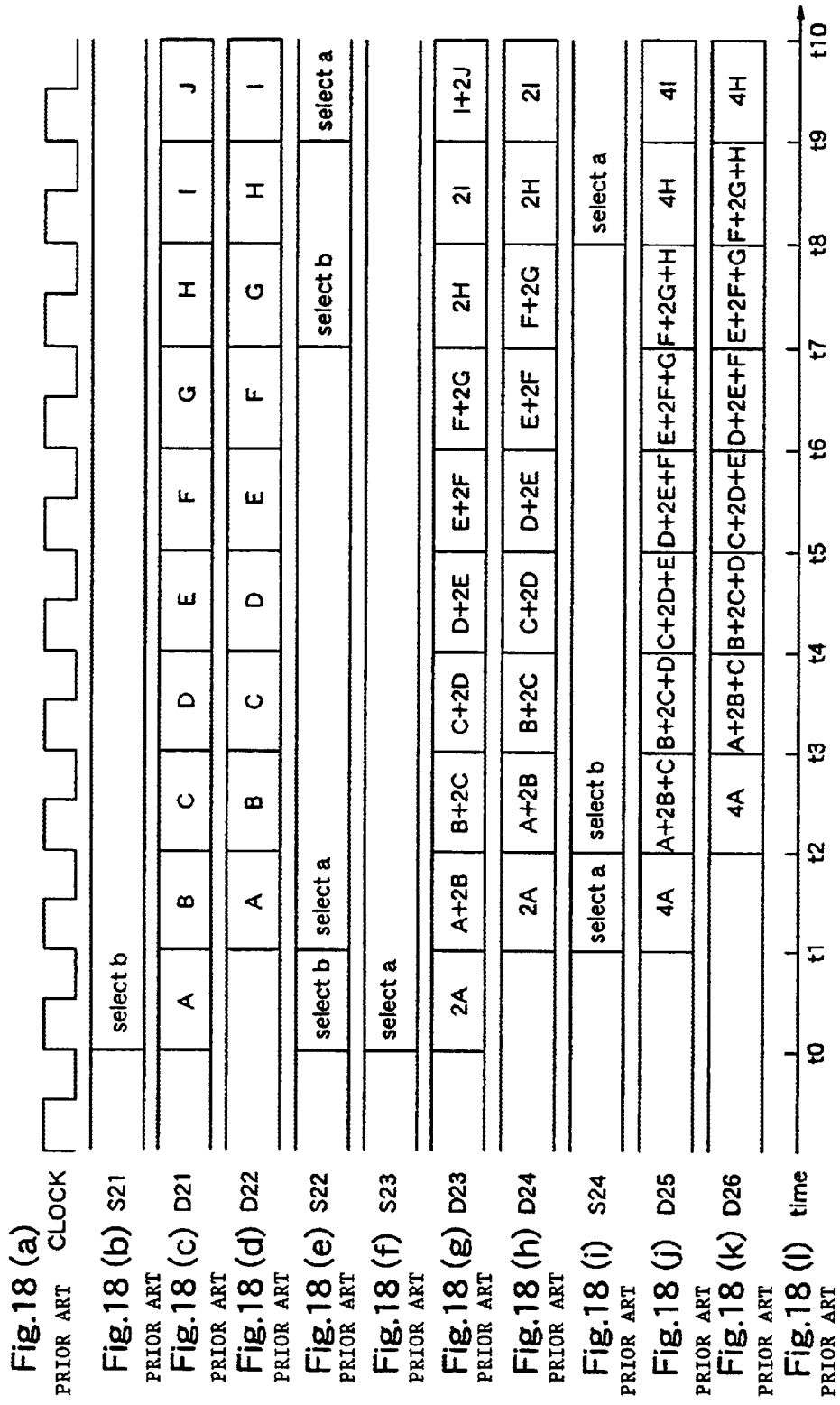

Fig.19 (a) PRIOR ART CLOCK

Fig.19 (b) PRIOR ART S31  select a

Fig.19 (f) PRIOR ART S32  select b

Fig.19 (g) PRIOR ART S33  select b

Fig.19 (h) PRIOR ART D34  A+I | B+J | C+K | D+L | E+M | F+N | G+O | H+P | I+Q | J+R | K+S | S+T | T+U

Fig.19 (i) PRIOR ART D35  1-bit rightward   A+I | B+J | C+K | D+L | E+M | F+N | G+O | H+P | I+Q | J+R | K+S | S+T Fig.19 (j) PRIOR ART D36  Don't care Fig.19 (k) PRIOR ART S34  select a Fig.19 (l) PRIOR ART D37  2(A+I) | 2(B+J) | 2(C+K) | 2(D+L) | 2(E+M) | 2(F+N) | 2(G+O) | 2(H+P) | 2(I+Q) | 2(J+R) | 2(K+S) | 2(S+T)

Fig.19 (m) PRIOR ART D38  2(A+I) | 2(B+J) | 2(C+K) | 2(D+L) | 2(E+M) | 2(F+N) | 2(G+O) | 2(H+P) | 2(I+Q) | 2(J+R) | 2(K+S)

Fig.19 (n) PRIOR ART time  t0 t1 t2 t3 t4 t5 t6 t7 t8 t9 t10 t11 t12 t13 t14 t15 t16 t17 t18 t19 t20 t21

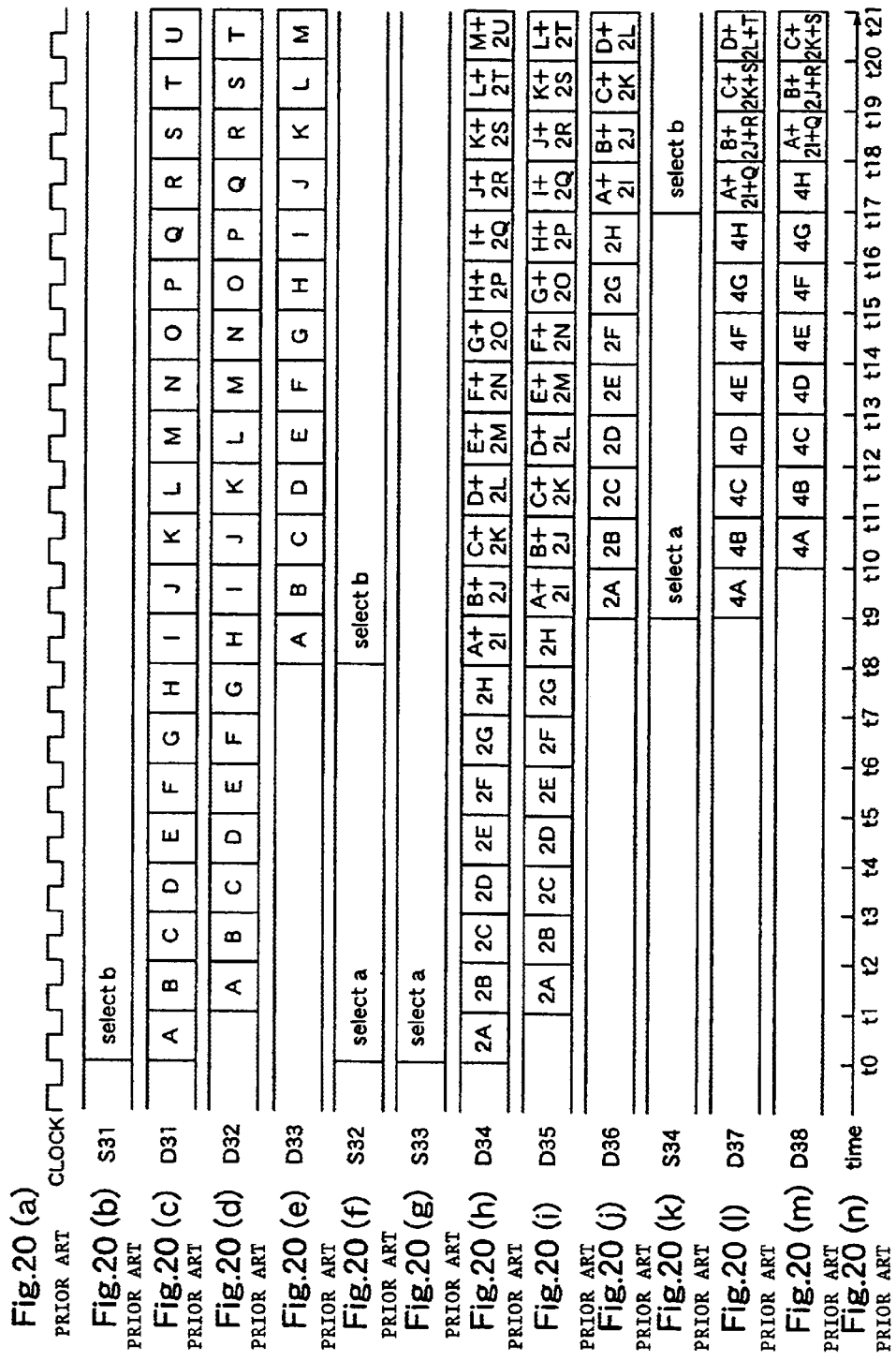

FILTER ARITHMETIC DEVICE

TECHNICAL FIELD

The present invention relates to filter operation apparatus which are used in image coding methods.

BACKGROUND ART

As the international standard systems as to image coding, there are MPEG (Moving Picture Experts Group) according to ISO (International Standardization Organization), ITU-T (International Telecommunication Union-Telecommunication Sector) recommendation H.261 and the like. Although the use of MPEG is increasing in recent years, the conventional H.261 is still utilized as always in the present circumstances. That is, both of the systems exist together at present. Therefore, filter operation apparatus which can be used in both of the systems are required.

Initially, these systems are briefly described.

In the coding method according to MPEG of ISO, DCT (Discrete Cosine Transform) which performs orthogonal transform as a compression method utilizing a spatial correlation is used for bidirectional motion compensation interframe prediction as a method utilizing a temporal correlation. Half-pixel motion compensation used in this method is a simple method of averaging two pixels when the position of a pixel to be predicted is between the two pixels and averaging four pixels when the position is among the four pixels. Accordingly, the half-pixel motion compensation not only increases the prediction accuracy but also has a function of a spatial low-pass filter. Further, when the four pixels are averaged, there are some cases where an average pixel value in the horizontal direction is obtained and then an average pixel value in the vertical direction with respect to the obtained average pixel value is obtained as an average of the four pixel values.

In the coding method according to ITU-T recommendation H.261, compression methods utilizing the spatial correlation or temporal correlation are used as in MPEG system. However, in this coding method, an intra-loop filter, i.e., a spatial low-pass filter is used to avoid the situation that the distortion occurring due to the quantization is stored in a prediction memory, whereby the degradation in image quality is increased and the prediction efficiency is decreased.

In the processing of this intra-loop filter, the weighting is performed according to the positions of pixels, as shown in FIG. 21.

To be specific, a pixel value P of a pixel p in each region shown in FIG. 21 obtains a new pixel value P' in a following manner.

As for a pixel value P of a pixel p in a region 2100, $$P'=16\times(P/16) \quad (1)$$

As for a pixel value P of a pixel p in a region 2101, $$P'=((4\times A)+(8\times P)+(4\times B))/16 \quad (2)$$

As for a pixel P in a region 2102, $$P'=(A+(2\times B)+C+(2\times D)+(4\times P)+(2\times E)+F+(2\times G)+H))/16 \quad (3)$$

In the expressions (1)~(3), a~h each denote a pixel adjacent to each of the pixels p shown in FIG. 21 and A~H each denote a pixel value of each of the pixels a~h shown in FIG. 21. The processing for the weighting is performed twice, i.e., in the horizontal direction and vertical direction.

Usually, the conventional filter operation apparatus which realizes the filter processing of the above-mentioned coding method according to MPEG of ISO and coding method according to ITU-T recommendation H.261 in an apparatus is constructed so that a part of the apparatus is shared in the filter processing of these two coding methods, thereby avoiding the increase in the scale of hardware. If each of parts associated with these two coding methods is independently provided in one apparatus, the scale of the hardware is adversely increased.

The structure and operation of the conventional filter operation apparatus X are briefly described with reference to drawings.

FIG. 14 is a diagram simply illustrating a structure of the conventional filter operation apparatus X having a horizontal half-pixel motion compensation and horizontal. intra-loop filtering means 1400 and a vertical half-pixel motion compensation and vertical intra-loop filtering means 1401. FIG. 15 is a block diagram illustrating a structure of the horizontal half-pixel motion compensation and horizontal intra-loop filtering means 1400. FIG. 16 is a block diagram illustrating a structure of the vertical half-pixel motion compensation and vertical intra-loop filtering means 1401.

Initially, the structure of the horizontal half-pixel motion compensation and horizontal intra-loop filtering means 1400 is described with reference to FIG. 15. The horizontal half-pixel motion compensation and horizontal intra-loop filtering means 1400 comprises a first pixel delay means 1500 for delaying an input pixel D21 for a predetermined period and outputting a delayed pixel, a multiplication means 1501 for multiplying the input pixel D21 by two and outputting a multiplied pixel, a first selection means 1502 for selectively outputting one of the input pixel D21 and the pixel which is obtained by multiplying the input pixel D21 by two by the multiplication means 1501 in accordance with a mode switch signal S21 for switching the mode between "half-pixel motion compensation mode" and "intra-loop filtering mode", a second selection means 1503 for selectively outputting one of "0" and the output of the first pixel delay means 1500 in accordance with a first intra-loop filter control signal S22, a third selection means 1504 for selectively outputting one of the output of the first selection means 1502 and the output of the second selection means 1503 in accordance with a half-pixel motion compensation control signal S23, a first addition means 1505 for adding the output of the second selection means 1503 and the output of the third selection means 1504 and outputting output data D22, a second pixel delay means 1506 for delaying the output signal of the first addition means 1505 for a predetermined period and then outputting output data D23, a fourth selection means 1507 for selectively outputting one of the input pixel D21 and the output signal of the second pixel delay means 1506 in accordance with a second intra-loop filter control signal S24, a second addition means 1508 for adding the output of the second pixel delay means 1506 and the output of the fourth selection means 1507 and outputting output data D24, and a third pixel delay means 1509 for delaying the output signal of the second addition means 1508 for a predetermined period and then outputting output data D25.

Next, the operation of the horizontal half-pixel motion compensation and horizontal intra-loop filtering means 1400 is described with respect to the cases of half-pixel motion compensation and intra-loop filtering, respectively. Assume that the first pixel delay means 1500, the second pixel delay means 1506, and the third pixel delay means 1509 each delay the data for one clock.

A format of input data in the case of half-pixel motion compensation is described with reference to FIG. 3. As shown in FIG. 3(*a*), the format of input data which are subjected to the horizontal processing for generating 8×8 half-pixels in the horizontal processing consists of 9×9 pixels. As shown by arrows in FIG. 3(*a*), the processing is performed successively from left to right and from top to bottom on a two-dimensional space.

To be more specific, the processing is performed in the order of A→B→C→ . . . →I→J→K→ . . . →Z as shown in FIG. 3(*a*). Timing charts of FIGS. 17 show this operation in more detail. In FIGS. 17, S21 denotes a control signal for controlling the first selection means 1502 shown in FIG. 15 to output "a". S22 denotes a control signal for controlling the second selection means 1503 shown in FIG. 15 to output "b". S23 denotes a control signal for controlling the third selection means 1504 shown in FIG. 15 to output "b". S24 denotes a control signal for controlling the fourth selection means 1507 shown in FIG. 15 to output "a".

A format of input data in the case of intra-loop filtering is described with reference to FIG. 4. As shown in FIG. 4(*a*), the format of input data which are subjected to the horizontal processing of intra-loop filtering consists of 8×8 pixels. As shown by arrows in FIG. 4(*a*), the processing is performed successively from left to right and from top to bottom on a two-dimensional space.

To be more specific, the processing is performed in the order of A→B→C→ . . . →F→G→H→I→J→ . . . →Z as shown in FIG. 4(*a*). Timing charts in FIGS. 18 show this operation in more detail. In FIGS. 18, S21 denotes a control signal for controlling the first selection means 1502 shown in FIG. 15 to output "b". S23 denotes a control signal for controlling the second selection means 1503 shown in FIG. 15 to output "a". S22 denotes a control signal for controlling the third selection means 1504 shown in FIG. 15 to output "b" during the period of times t0~t1, output "a" during the period of t1~t7, output "b" during the period of t7~t9, output "a" during the period of t9~t10, and thereafter repeat the above-mentioned operations of t0~t10. S24 denotes a control signal for controlling the fourth selection means 1507 shown in FIG. 15 to output "a" during the period of times t1~t2, output "b" during the period of times t2~t8, output "a" during the period of t8~t10, and thereafter repeat the above-mentioned operations of t1~t10.

The structure of the vertical half-pixel motion compensation and vertical intra-loop filtering means 1401 is described with reference to FIG. 16. The vertical half-pixel motion compensation and vertical intra-loop filtering means 1401 comprises a first pixel delay means 1600 for delaying an input pixel D31 for a predetermined period (one clock) and outputting output data D32, a first delay means 1601 for delaying the input pixel D32 by 8 pixels (corresponding to 8 clocks) and outputting output data D33, a multiplication means 1602 for multiplying the input pixel D31 by two and outputting the multiplied pixel, a first selection means 1603 for selectively outputting one of the input pixel D31 and the pixel which is obtained by multiplying the input pixel D31 by two with the multiplication means 1602 in accordance with a mode switch signal S31 for switching the mode between "half-pixel motion compensation mode" and "intra-loop filtering mode", a second selection means 1604 for selectively outputting one of "0" and the output data D33 in accordance with a first intra-loop filter control signal S32, a third selection means 1605 for selectively outputting one of the output of the first selection means 1603 and the output of the second selection means 1604 in accordance with the half-pixel processing control signal S33, a first addition means 1606 for adding the output of the second selection means 1604 and the output of the third selection means 1605 and outputting output data D34, a second pixel delay means 1607 for delaying the output signal of the first addition means 1606 for a predetermined period (corresponding to one clock) and outputting output data D35, a second delay means 1608 for delaying the output data D35 by 8 pixels (corresponding to 8 clocks) and outputting output data D36, a fourth selection means 1609 for selectively outputting one of the output data D35 and output data D36 in accordance with the above-described mode switch signal S31, a fifth selection means 1610 for selectively outputting one of the output data D32 and the output data of the fourth selection means 1609 in accordance with a second intra-loop filter control signal S34, a second addition means 1611 for adding the output data of the fourth selection means 1609 and the output data of the fifth selection means 1610 and outputting output data D37, a third pixel delay means 1612 for delaying the output data of the second addition means 1611 for a predetermined period (corresponding to one clock) and outputting output data D38, and a division means 1613 for dividing the output data D38 by 16 and outputting the divided data.

Then, the operation of the vertical half-pixel motion compensation and vertical intra-loop filtering means 1401 is described with respect to the cases of half-pixel motion compensation and intra-loop filtering, respectively.

A format of input data in the case of half-pixel motion compensation is described with reference to FIG. 3. Like in the case of the horizontal processing, the input data format consists of 9×9 pixels as shown in FIG. 3(*a*). As shown by arrows in FIG. 3(*a*), the processing is performed successively from left to right and from top to bottom on a two-dimensional space.

To be more specific, the processing is performed in the order of A→B→C→ . . . →I→J→K→ . . . →Z as shown in FIG. 3(*a*). Timing charts in FIGS. 19 show this operation in more detail. In FIGS. 19, S31 denotes a control signal for controlling the first selection means 1603 and the fourth selection means 1609 shown in FIG. 16 to output "a". S32 denotes a control signal for controlling the-second selection means 1604 shown in FIG. 16 to output "b". S33 denotes a control signal for controlling the third selection means 1605 shown in FIG. 16 to output "b". S34 denotes a control signal for controlling the fifth selection means 1610 shown in FIG. 16 to output "a".

A format of input data in the case of intra-loop filtering is described with reference to FIG. 4. Like the input data format in the case of the horizontal processing of the intra-loop filtering, the format of the input data which are subjected to the vertical processing consists of 8×8 pixels as shown in FIG. 4(*a*). As shown by arrows in FIG. 4(*a*), the processing is performed successively from left to right and from top to bottom on a two-dimensional space.

To be more specific, the processing is performed in the order of A→B→C→ . . . →F→G→H→I→J→ . . . →Z as shown by the arrows in FIG. 4(*a*). Timing charts in FIGS. 20 show this operation in more detail. In FIGS. 20, S31 denotes a control signal for controlling the first selection means 1603 and the fourth selection means 1609 shown in FIG. 16 to output "b". S32 denotes a control signal for controlling the second selection means 1604 shown in FIG. 16 to output "a" during the period of times t0~t8, output "b" during the period of t8~t56, and output "a" during the period of t56~t64. S33 denotes a control signal for controlling the third selection means 1605 shown in FIG. 16 to output "a". S34 denotes a control signal for controlling the fifth selection means 1610 shown in FIG. 16 to output "a" during the period of times t9~t17, output "b" during the period of t17~t65, and output "a" during the period of t65~t73. (Here, the time subsequent to t22 is not shown in FIG. 20.)

As described above, in the conventional filter operation apparatus realizing the half-pixel motion compensation and the intra-loop filtering, different units are required respectively for the horizontal processing and the vertical processing, whereby the scale of hardware is increased.

The present invention is made in view of the above-described problems. In the present invention, attentions are paid to the fact that a horizontal processing apparatus and a vertical processing apparatus in the processing of half-pixel motion compensation and intra-loop filter for input pixel data can share a core operation unit. When a part which is in the operation unit and interferes the sharing, for example a part for adjusting the transition timing of data is replaced with a unit which adjusts the transition timing of data by switching the mode in a preprocessor, the operation unit in the horizontal processing unit and the vertical processing unit can be shared. Therefore, the filter operation apparatus which can decrease the scale of hardware can be provided.

DISCLOSURE OF THE INVENTION

A filter operation apparatus of first embodiment of the present invention processes input pixel data according to one of a first filter processing and a second filter processing which is different from the first filter processing, and comprises at least first pixel delay means for delaying the input pixel data for a predetermined period and outputting the delayed data; second pixel delay means for delaying the output data of the first pixel delay means for a predetermined period and outputting the delayed data; first multiplication means for multiplying the output data of the first pixel delay means by four and outputting the multiplied data; filter processing switch signal generation means for generating a filter processing switch signal for performing switching to process the input pixel data according to one of the first filter processing and the second filter processing; second multiplication means for multiplying the output data of the first pixel delay means by one when the input pixel data are processed according to the first filter processing in accordance with the filter processing switch signal, and multiplying the output data of the first pixel delay means by two when the input pixel data are processed according to the second filter processing in accordance with the filter processing switch signal; first selection means for selectively outputting one of "0" and the output data of the second pixel delay means in accordance with the filter processing switch signal; addition means for adding the input pixel data, the output data of the second multiplication means, and the output data of the first selection means; selection control signal generation means for outputting a selection control signal in accordance with the filter processing switch signal; second selection means for selectively outputting one of the output data of the first multiplication means and the output data of the addition means in accordance with the selection control signal; mode switch signal output means for outputting a mode switch signal for switching a mode between a horizontal processing mode in which the input pixel data are processed in a horizontal direction and a vertical processing mode in which the input pixel data are processed in a vertical direction; multiplier factor control signal generation means for outputting a multiplier factor control signal on the basis of the filter processing switch signal and the mode switch signal; third pixel delay means for delaying the output data of the second selection means for a predetermined period and outputting the delayed data; and third multiplication means for multiplying the output data of the third pixel delay means by one of one, ½, and ¹⁄₁₆ in accordance with the multiplier factor control signal which is output by the multiplier factor control signal generation means.

This filter operation apparatus can share the operation unit in the horizontal processing apparatus and the vertical processing apparatus for the input image data. Therefore, the circuit scale of the hardware part can be reduced, whereby the scale of the filter operation apparatus can be reduced.

According to second embodiment, in the filter operation apparatus of first embodiment, it is a preferable embodiment that the addition means add an output of a register which contains values for performing "rounding", to one of an operation result of the first filter processing, an operation result of the second filter processing, an operation result of the "horizontal processing mode" in which the input pixel data are processed in the horizontal direction, and an operation result of the "vertical processing mode" in which the input pixel data are processed in the vertical direction.

This filter operation apparatus includes the register which contains the values for performing the "rounding" according to the respective processing, and has a function of adding a value for performing the rounding with the addition means which can receive four values. Therefore, the degradation in accuracy is suppressed.

According to third embodiment, the filter operation apparatus of first embodiment comprises fourth pixel delay means for delaying the input pixel data for a predetermined period which is at least equal to or longer than the delay time of the first pixel delay means, and outputting the delayed data; fifth pixel delay means for delaying the output data of the fourth pixel delay means for a period which is as long as the delay time of the fourth pixel delay means, and outputting the delayed data; third selection means for selectively outputting one of the output data of the first pixel delay means and the output data of the fourth pixel delay means, in place of the output data of the first pixel delay means, to the first multiplication means and the second multiplication means, in accordance with the mode switch signal; and fourth selection means for selectively outputting one of the output data of the second pixel delay means and the output data of the fifth pixel delay means, in place of the output data of the second pixel delay means, to the first selection means.

This filter operation apparatus also can share the operation unit in the horizontal processing apparatus and the vertical processing apparatus even when the horizontal processing and vertical processing for the input image data is successively performed only in one direction. Therefore, the circuit scale of the hardware part can be reduced, whereby the scale of the filter operation apparatus can be reduced.

BRIEF DESCRIPTION OF THE DRAWINGS

FIGS. 5 are timing charts showing the operations in horizontal and vertical processing of the half-pixel motion compensation by the filter operation apparatus according to the first embodiment.

FIGS. 6 are timing charts showing the operations in horizontal processing of the intra-loop filtering by the filter operation apparatus according to the first embodiment.

FIGS. 12 are timing charts showing the operations in vertical processing of the half-pixel motion compensation by the filter operation apparatus according to the second embodiment.

FIGS. 13 are timing charts showing the operations in vertical processing of the intra-loop filtering by the filter operation apparatus according to the second embodiment.

FIGS. 17 are timing charts showing the operations of a unit performing horizontal processing of the half-pixel motion compensation in the conventional filter operation apparatus.

FIGS. 18 are timing charts showing the operations of a unit performing horizontal processing of the intra-loop filtering in the conventional filter operation apparatus.

FIGS. 19 are timing charts showing the operations of a unit performing vertical processing of the half-pixel motion compensation in the conventional filter operation apparatus.

FIGS. 20 are timing charts showing the operations of a unit performing vertical processing of the intra-loop filtering in the conventional filter operation apparatus.

BEST MODE FOR CARRYING OUT THE INVENTION

Hereinafter, embodiments of the present invention will be described with reference to the drawings. The embodiments which are shown herein are merely examples and the present invention is not limited to these embodiments.

EMBODIMENT 1

Initially, a filter operation apparatus according to the present invention will be described as a first embodiment with reference to the drawings.

Figure 1:
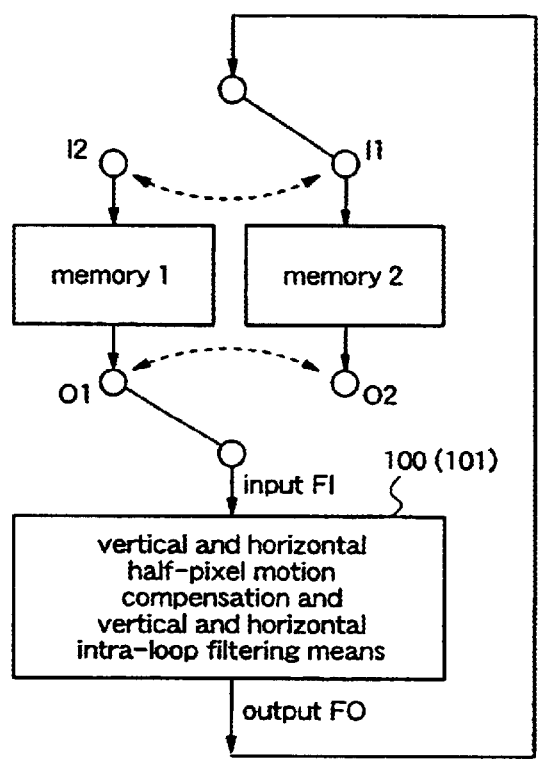
FIG. 1 is a diagram showing the concept of filter operation apparatus according to a first embodiment and a second embodiment.
Figure 2:
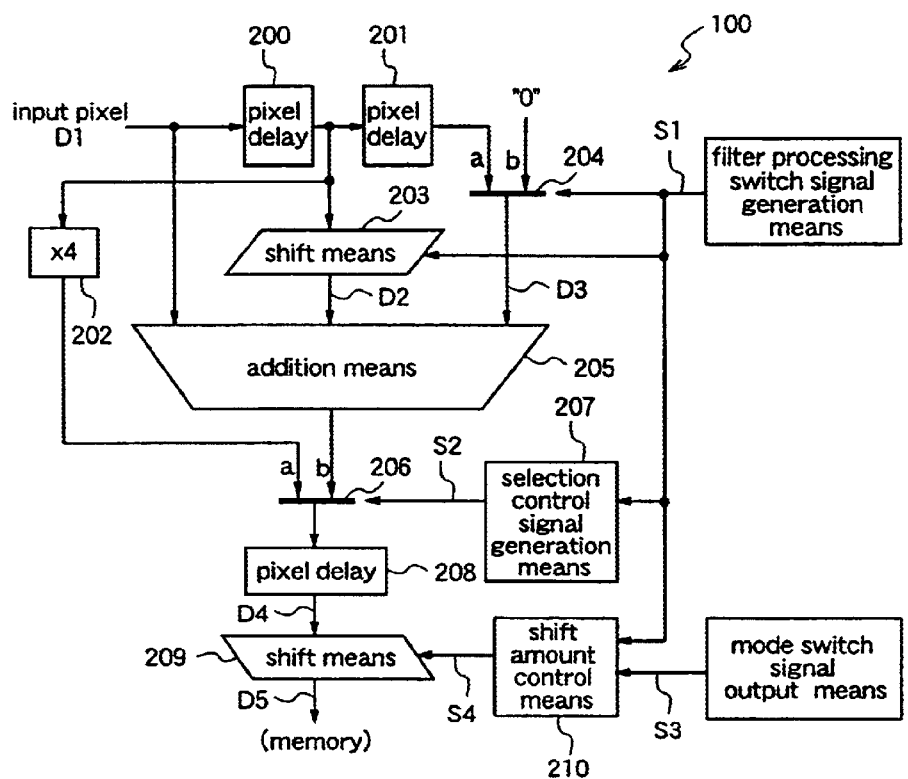
FIG. 2 is a block diagram illustrating a vertical and horizontal half-pixel motion compensation and vertical and horizontal intra-loop filtering means according to the first embodiment.

FIG. 1 is a diagram showing the concept of a filter operation apparatus A according to the present invention, involving a vertical and horizontal half-pixel motion compensation and vertical and horizontal intra-loop filtering means 100. FIG. 2 is a block diagram illustrating a structure of the half-pixel motion compensation and intra-loop filtering means 100.

The filtering apparatus A shown in FIG. 1 comprises two memories which contain input and output data of a filter operation, and switches or selectors for performing control so as to prevent simultaneous accesses to the input memory and output memory.

Here, the description is given as an example of the operation of this filtering unit A in the case where the horizontal processing is performed first and the vertical processing is performed next.

Initially, when input data which are subjected to the horizontal processing are stored in a memory 1 and output data are stored in a memory 2, a terminal O1 of the memory 1 is connected to a terminal FI of the half-pixel motion compensation and intra-loop filtering means 100, and a terminal FO of the half-pixel motion compensation and intra-loop filtering means 100 is connected to a terminal I1 of the memory 2. Then, when the output data of the horizontal processing are subjected to the vertical processing, a terminal O2 of the memory 2 is connected to the terminal FI of the half-pixel motion compensation and intra-loop filtering means 100, and the terminal FO of the half-pixel motion compensation and intra-loop filtering means 100 is connected to a terminal I2 of the memory 1. That is, the connection relationship between the filtering apparatus and memories in the horizontal processing is reversed in the vertical processing.

In the example shown herein, the memories each comprising only one port for reading/writing data are employed. However, when a dual port memory comprising a port for reading data and a port for writing data is employed, only one memory is required.

Next, the half-pixel motion compensation and intra-loop filtering means 100 as shown in FIG. 2 is described.

As shown by the block diagram of FIG. 2, the half-pixel motion compensation and intra-loop filtering means 100 comprises a first pixel delay means 200 for delaying an input pixel D1 for a predetermined period (corresponding to one clock) and outputting a delayed pixel, a second pixel delay means 201 for delaying the output of the first pixel delay means 200 for a predetermined period (corresponding to one clock) and outputting a delayed output, a multiplication means 202 for multiplying the output of the first pixel delay means 200 by four and outputting a multiplied output, a left shift means 203 for leftward-logically shifting the output of the first pixel delay means 200 by 0 bit (i.e., multiplying the output by one) in the "half-pixel motion compensation mode" and leftward-logically shifting the output by 1 bit (i.e., multiplying the output by two) in the "intra-loop filtering mode", in accordance with a mode switch signal S1 for switching the mode between the "half-pixel motion compensation mode" and "intra-loop filtering mode", and outputting output data D2, a first selection means 204 for selectively outputting one of "0" and the output of the second pixel delay means 201 as output data D3 in accordance with the mode switch signal S1, an addition means 205 for adding the input pixel D1, the output data D2 and the output data D3, a second selection means 206 for selectively outputting one of the output of the multiplication means 202 and an output of the addition means 205 in accordance with a control signal S2, a selection control signal generation means 207 for outputting the control signal S2 for the second selection means 206 in accordance with the mode switch signal S1, a third pixel delay means 208 for delaying the output of the second selection means 206 for a predetermined period (corresponding to one clock) and outputting output data D4, a right shift means 209 for arithmetically-rightward shifting the output data D4 by one of 0 bit (i.e., multiplying the output by one), 1 bit (i.e., multiplying the output by ½) and 4 bits (i.e., multiplying the output by ¹⁄₁₆) and outputting output data D5 in accordance with a shift amount control signal S4, and a shift amount control means 210 for outputting the shift amount control signal S4 for controlling the shift amount of the right shift means 209 in accordance with the mode switch signal S1 and a mode switch signal S3 for switching the mode between "horizontal processing mode" and "vertical processing mode".

The operation in the horizontal processing of the half-pixel motion compensation and intra-loop filtering means 100 as shown in FIG. 2 is described with respect to the cases of the half-pixel motion compensation and intra-loop filtering, respectively.

A format of input data in the case of the half-pixel motion compensation is described with reference to FIG. 3. As shown in FIG. 3(a), the format of input data which are subjected to the horizontal processing for generating 8×8 half-pixels in the horizontal processing consists of 9×9 pixels. As shown by the arrows in FIG. 3(a), the processing is performed successively from left to right and from top to bottom on a two-dimensional space.

To be more specific, the processing is performed in the order of A→B→C→ . . . →I→J→K→ . . . →Z as shown in FIG. 3(a). The timing charts of FIGS. 5 show this operation in more detail. In FIGS. 5, S1 denotes a control signal for controlling the first selection means 204 shown in FIG. 2 to output "b" when the "half-pixel motion compensation mode" is turned ON. S2 denotes a control signal for controlling the second selection means 206 shown in FIG. 2 to output "b". S3 denotes a control signal for switching the shift amount control means 210 shown in FIG. 2 to the "horizontal processing mode". S4 denotes a control signal for rightward-arithmetically shifting the output of the third pixel delay means 208 shown in FIG. 2 by 1 bit (i.e., multiplying the output by ½).

The format of input data in the case of intra-loop filter is described with reference to FIG. 4. The format of input data which are subjected to the horizontal processing of intra-loop filter consists of 8×8 pixels as shown in FIG. 4(a). As shown by arrows in FIG. 4(a), the processing is performed successively from left to right and from top to bottom on a two-dimensional space.

To be more specific, as shown in FIG. 4(a), the processing is performed in the order of A→B→C→ . . . →F→G→H→I→J→ . . . →Z. The timing charts of FIGS. 6 show this operation in more detail. In FIGS. 6, S1 denotes a control signal for controlling the first selection means 204 shown in FIG. 2 to output "a" when the "intra-loop filtering mode", is turned ON. S2 denotes a control signal for controlling the second selection means 206 shown in FIG. 2 to output "a" during the period of times t1~t2, output "b" during the period of t2~t8, output "a" during the period of t8~t9, and thereafter repeat the above-mentioned operations of t1~t9. S3 denotes a control signal for switching the shift amount control means 210 shown in FIG. 2 to the "vertical processing mode". S4 denotes a control signal for rightward-arithmetically shifting the output of the third pixel delay means 208 shown in FIG. 2 by 0 bit (i.e., multiplying the output by one). The output data D5 of the intra-loop filter are stored in a memory. This memory is, for example, the one shown in FIG. 1.

The operation in the vertical processing of the half-pixel motion compensation and intra-loop filtering means 100 shown in FIG. 2 is described with respect to cases of half-pixel motion compensation and intra-loop filtering, respectively.

The format of input data in the case of the half-pixel motion compensation is described with reference to FIG. 3. As shown in FIG. 3(b), the format of input data which are subjected to the vertical processing for generating 8×8 half-pixels in the vertical processing consists of 9×9 pixels. As shown in FIG. 3(b), the processing is performed successively from top to bottom and from left to right on a two-dimensional space.

To be more specific, the processing is performed in the order of A→B→C→ . . . →I→J→K→ . . . →Z as shown in FIG. 3(b). The details of this operation are the same as those in the case of the horizontal processing. That is, timing charts which show this operation are the same as those shown in FIGS. 5.

The format of input data in the case of intra-loop filter is described with reference to FIG. 4. The format of input data which are subjected to the vertical processing of the intra-loop filtering consists of 8×8 pixels as shown in FIG. 4(b). As shown by arrows in FIG. 4(b), the processing is performed successively from top to bottom and from left to right on a two-dimensional space. To be more specific, the vertical processing is performed for output data which were subjected to the horizontal processing and normally processed in a following way.

Figure 4:
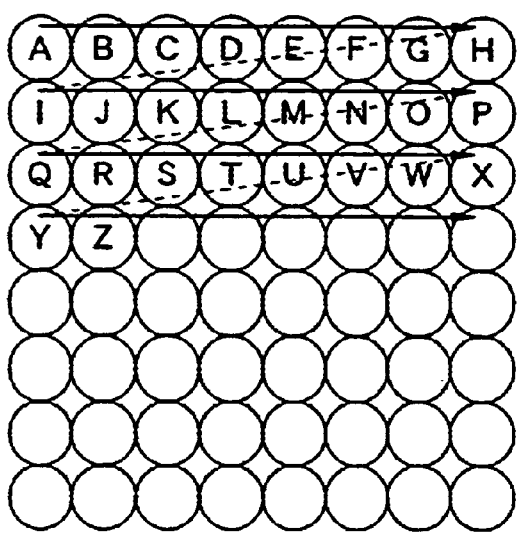
FIGS. 4 are diagrams showing the concepts of formats of input data which are subjected to the intra-loop filtering.
Figure 4:
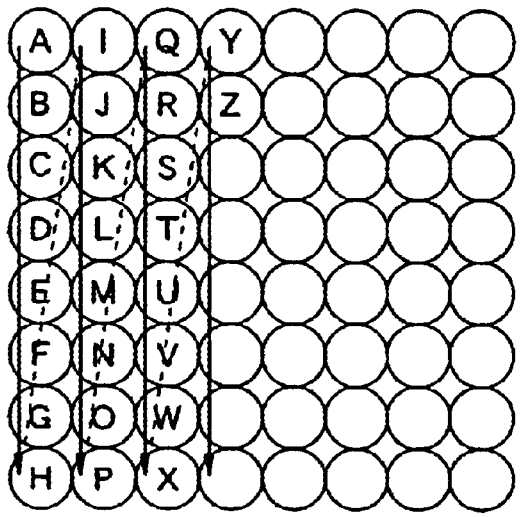
Figure 7:
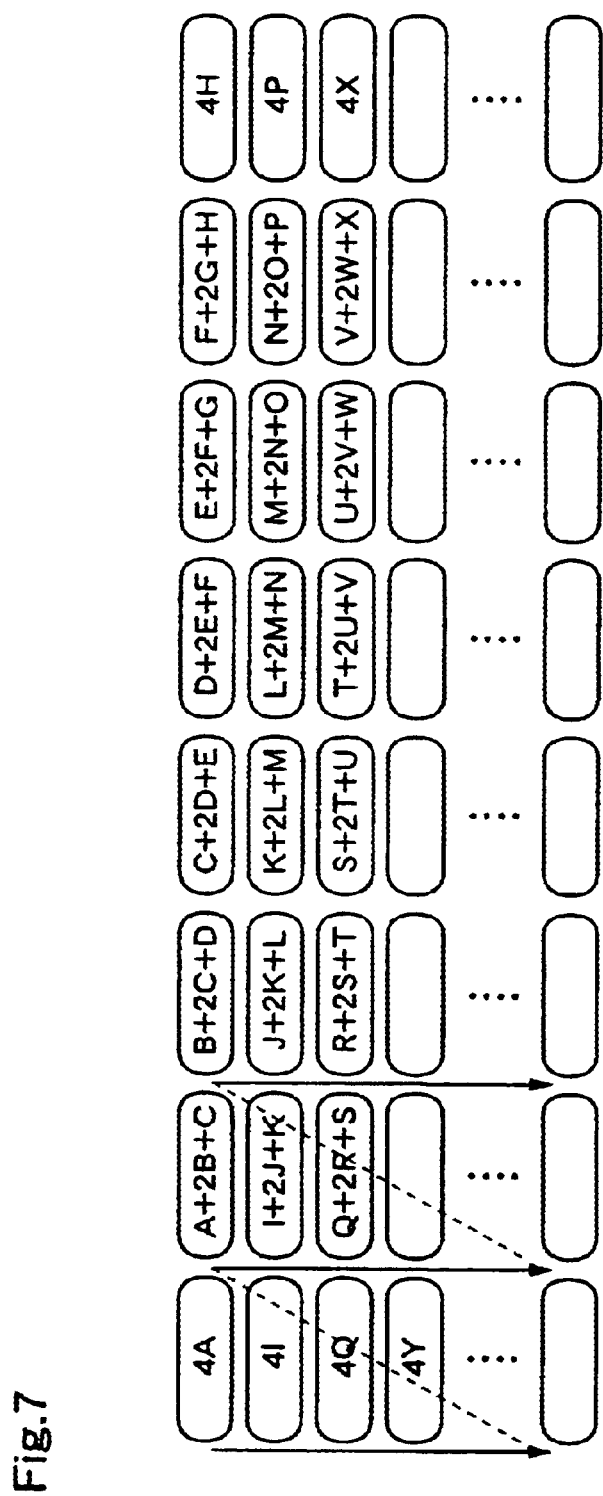
FIG. 7 is a diagram showing the concept of results of the horizontal processing of the intra-loop filtering.
Figure 8:
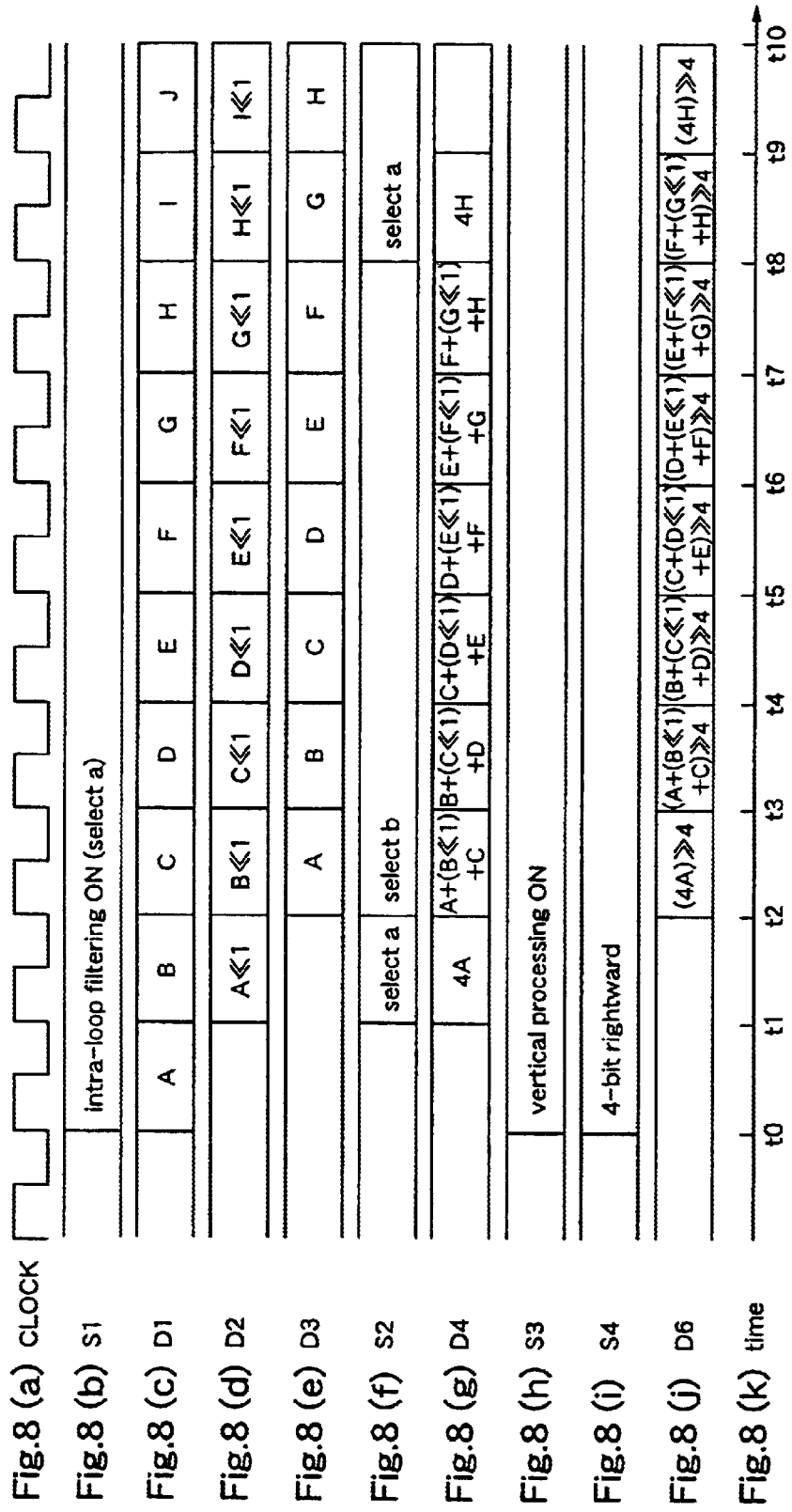
FIGS. 8 are timing charts showing the operations in vertical processing of the intra-loop filtering by the filter operation apparatus according to the first embodiment.

Data shown in FIG. 7 are results which are obtained by subjecting the 8×8-pixel data as shown in FIG. 4(b) to the horizontal processing. As shown by arrows in FIG. 7, the processing is performed successively from top to bottom and from left to right on a two-dimensional space. That is, the processing is to be performed in the order of A→B→C→ . . . F→G→H→I→J→ . . . →Z in FIG. 4 and values which are obtained by the horizontal processing are input. The timing charts of FIGS. 8 show this operation in more detail. In FIGS. 8, S1 denotes a control signal for controlling the first selection means 204 shown in FIG. 2 to output "a" when the "intra-loop filtering mode" is turned ON. S2 denotes a control signal for controlling the second selection means 206 shown in FIG. 2 to output "a" during the period of times t1~t2, output "b" during the period of t2~t8, output "a" during the period of t8~t9, and thereafter repeat the above-mentioned operations of t1~t9. S3 denotes a control signal for switching the shift amount control means 210 shown in FIG. 2 to the "vertical processing mode". S4 denotes a control signal for rightward-arithmetically shifting the output of the shift amount control means 210 shown in FIG. 2 by 4 bits (i.e., multiplying the output by ¹⁄₁₆).

Figure 9:
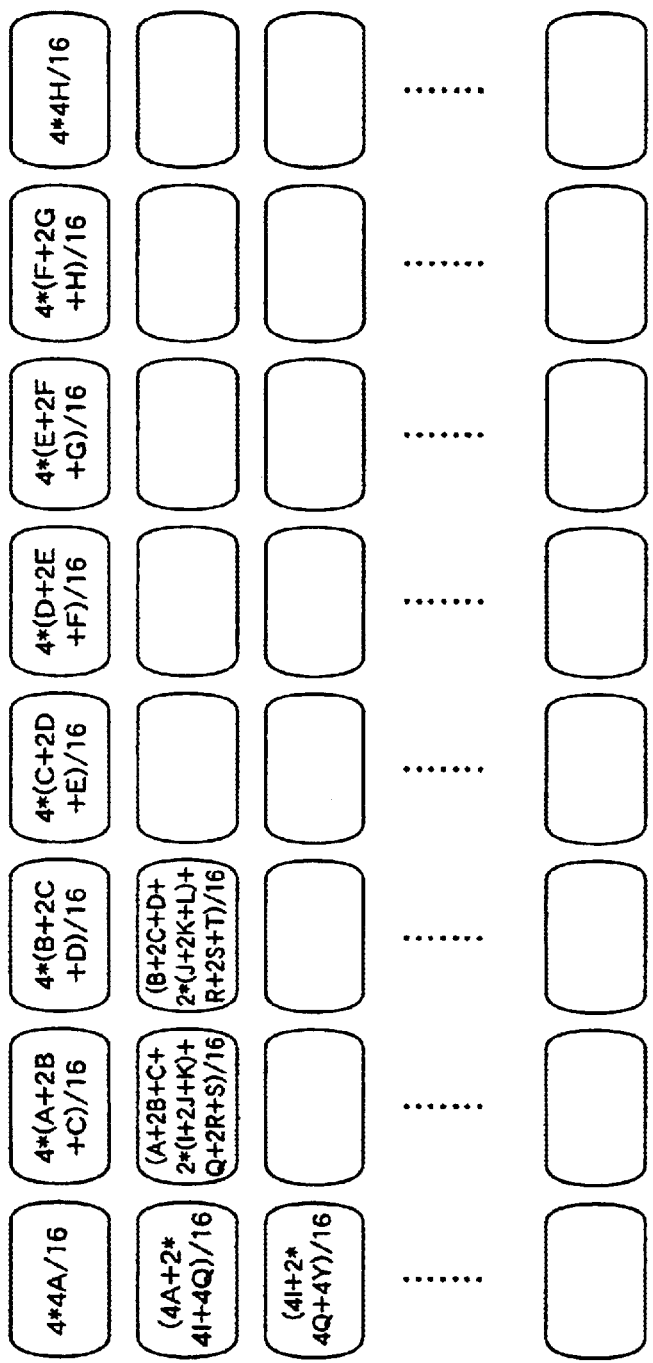
FIG. 9 is a diagram showing the concept of results of the vertical processing of the intra-loop filtering.

As described above, when the 8×8-pixel data shown in FIG. 4(a) are subjected to the horizontal and vertical processing, values as shown in FIG. 9 are obtained and consequently the intra-loop filter is realized.

When the filter operation apparatus A is constructed as described above, one apparatus can perform the horizontal processing and vertical processing of half-pixel motion compensation and the horizontal processing and vertical processing of intra-loop filtering. Therefore, the scale of hardware can be reduced.

Figure 10:
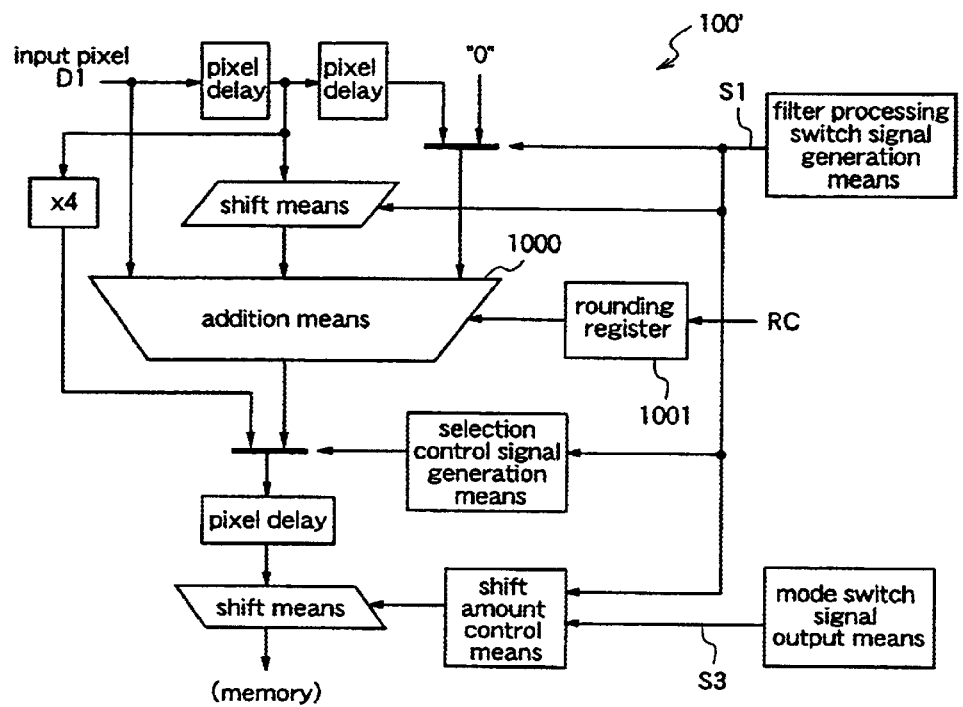
FIG. 10 is a block diagram illustrating a variation of the filter operation apparatus according to the first embodiment.

When a vertical and horizontal half-pixel motion compensation and vertical and horizontal intra-loop filter 100' which comprises a register 1001 containing values for performing "rounding" according to the respective processing, and has a function of adding a value for performing the rounding using an addition means 1000 which can receive four values is employed as a variation of this embodiment as shown in FIG. 10, the degradation in accuracy can be suppressed.

EMBODIMENT 2

A filter operation apparatus B having a structure which is different from that of the above-mentioned filter operation apparatus A will be described as a second embodiment, with reference to the drawings.

A diagram showing the concept of this filter operation apparatus B is similar to FIG. 1 as the concept diagram of the above-mentioned filter operation apparatus A of the first embodiment. This filter operation apparatus B involves a vertical and horizontal half-pixel motion compensation and vertical and horizontal intra-loop filtering means 101.

Figure 11:
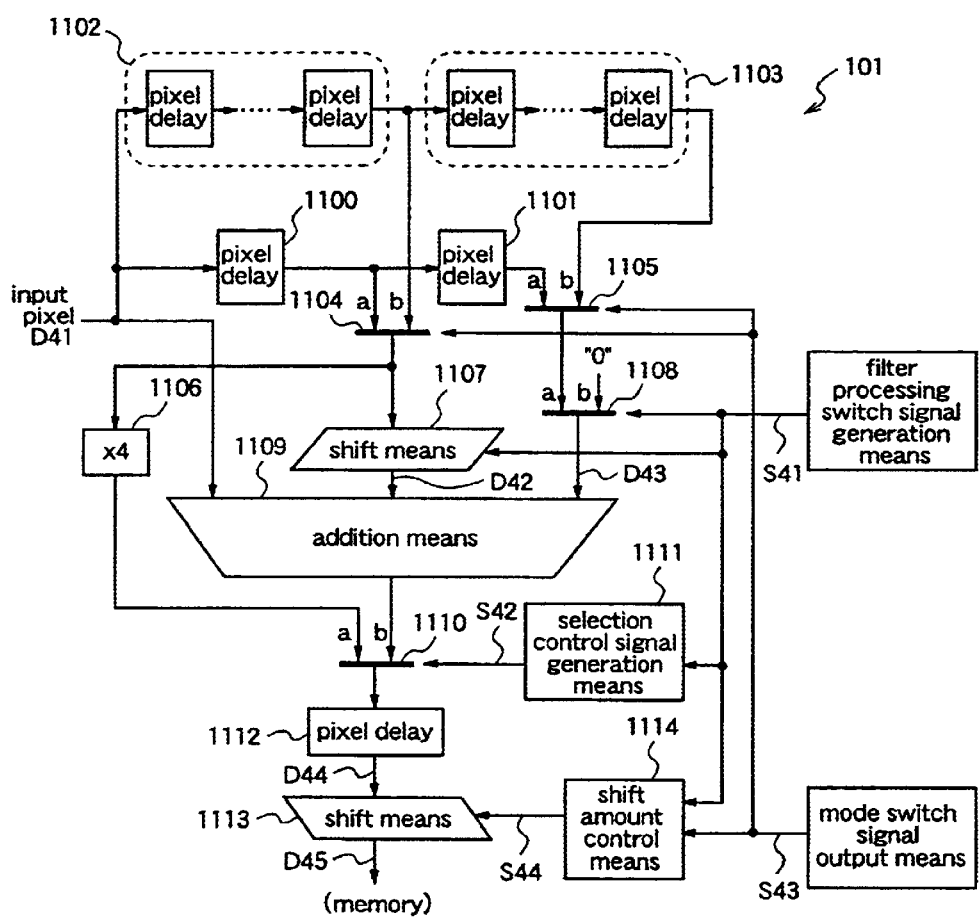
FIG. 11 is a block diagram illustrating a vertical and horizontal half-pixel motion compensation and vertical and horizontal intra-loop filtering means according to the second embodiment.
Figure 14:
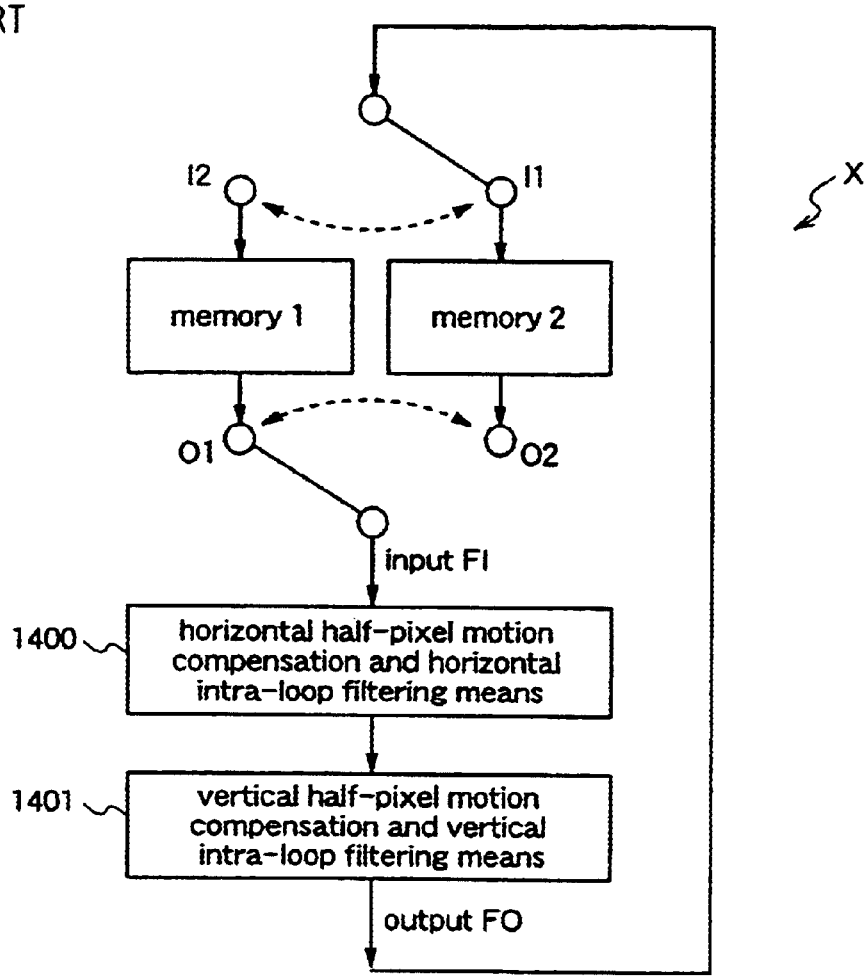
FIG. 14 is a diagram showing the concept of a conventional filter operation apparatus.
Figure 15:
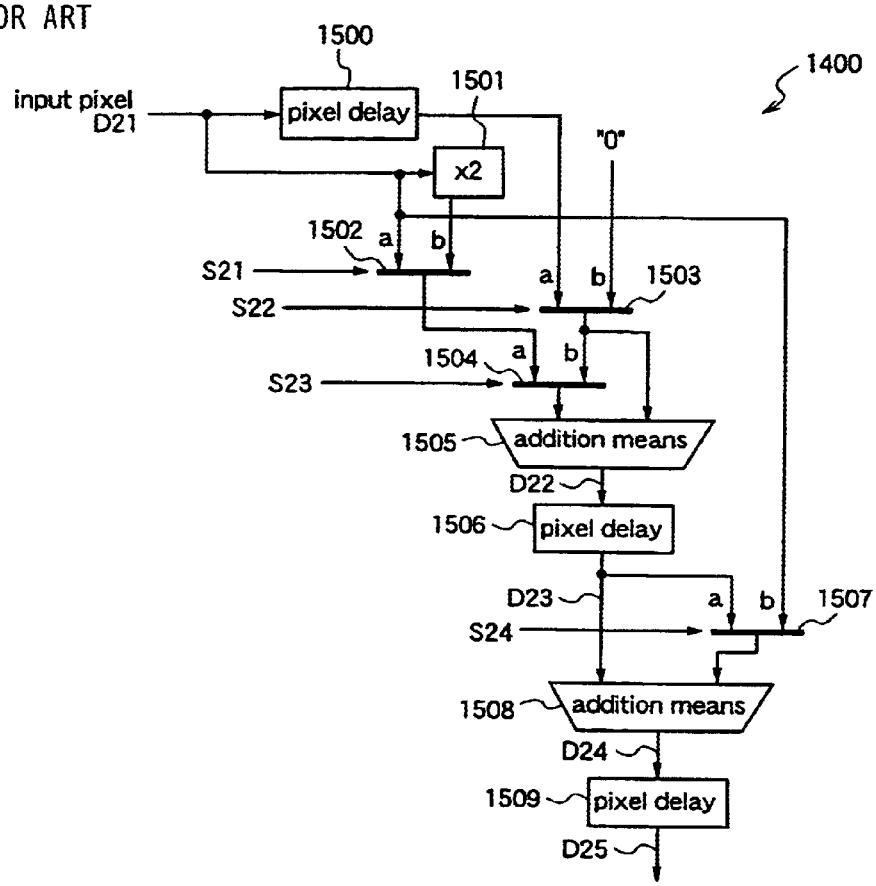
FIG. 15 is a block diagram illustrating a horizontal half-pixel motion compensation and horizontal intra-loop filtering means in the conventional filter operation apparatus.
Figure 16:
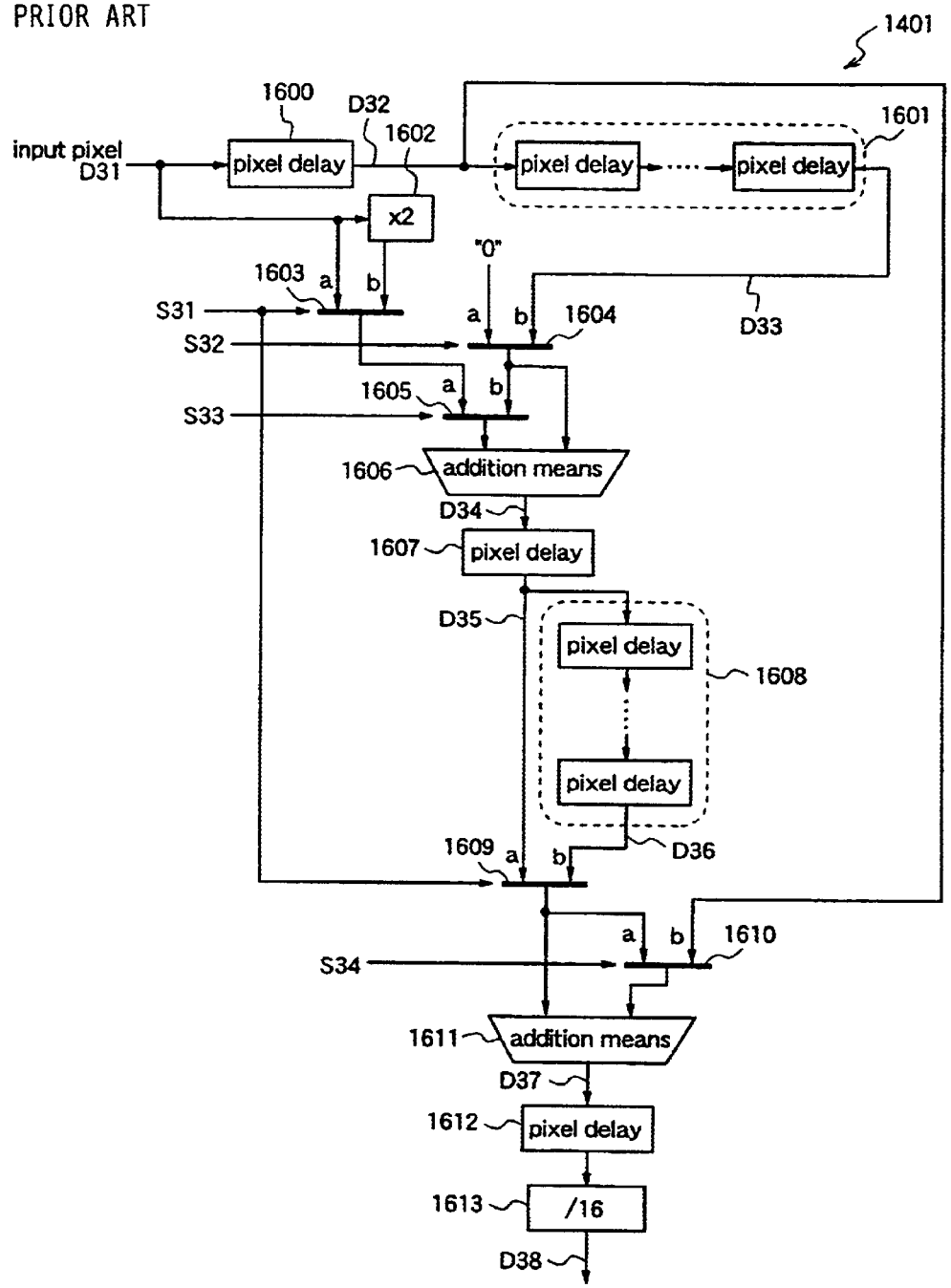
FIG. 16 is a block diagram illustrating a vertical half-pixel motion compensation and vertical intra-loop filtering means in the conventional filter operation apparatus.
Figure 21:
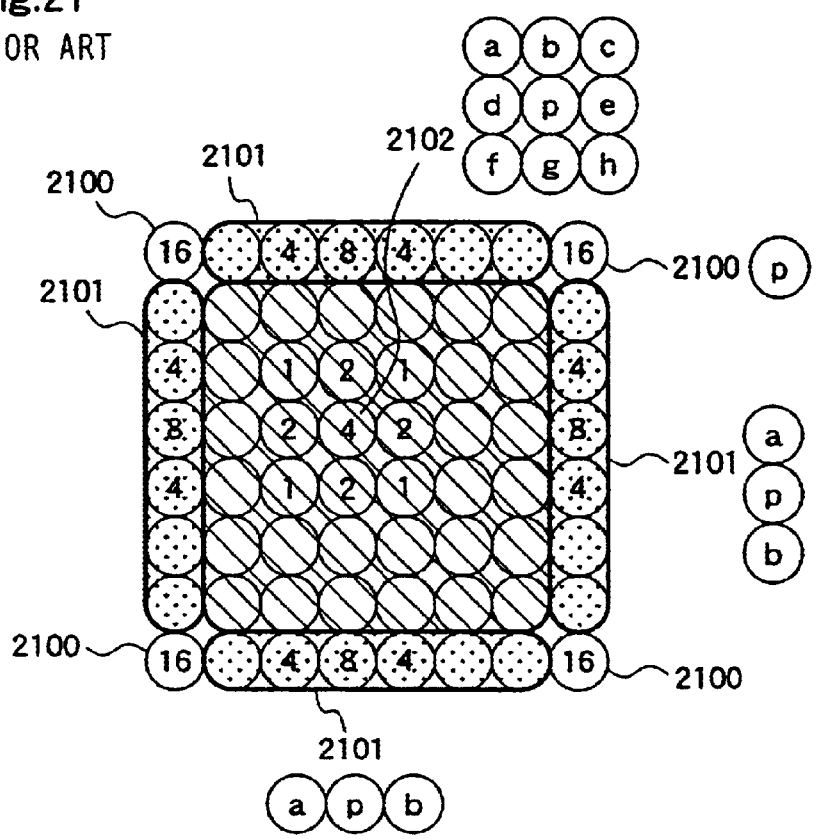
FIG. 21 is a diagram showing the concept of the processing of intra-loop filtering.

FIG. 11 is a block diagram illustrating a structure of the half-pixel motion compensation and intra-loop filtering means Initially, the features of the operation of the filter operation apparatus B are briefly described.

Figure 22:
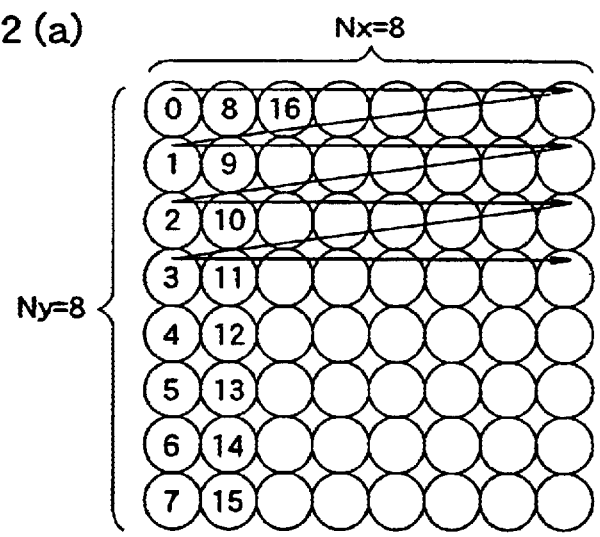
FIGS. 22 are diagrams for explaining an addressing function in the case where data to be used for filter operation are read in the vertical direction.
Figure 22:
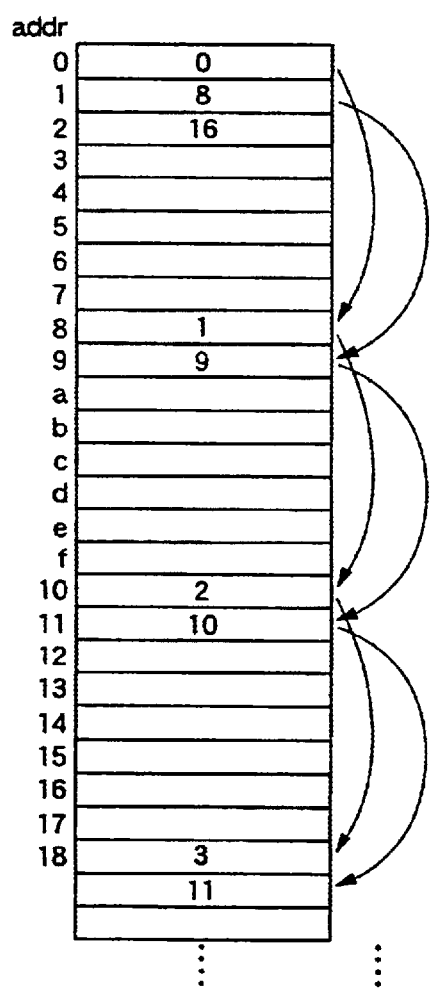

Usually, when data to be used for the filter operation shown in FIG. 22(*a*) are read in the vertical direction, i.e., in the order of 0, 1, 2, 3, . . . , the read data are stored in an one-dimensional space of an actual memory in the order shown by arrows in the figure, as shown in FIG. 22(*b*). When the data stored as shown in FIG. 22(*b*) are read, the special operation is required for the addressing. However, even when the memory has no addressing function, the filter operation apparatus B according to this embodiment can perform the filter operation.

The half-pixel motion compensation and intra-loop filtering means 101 in the filter operation apparatus B is described with reference to the drawings.

As shown by the block diagram of FIG. 11, the half-pixel motion compensation and intra-loop filtering means 101 comprises a first pixel delay means 1100 for delaying an input pixel D41 for a predetermined period (corresponding to one clock) and outputting a delayed pixel, a second pixel delaying means 1101 for delaying the output of the first pixel delay means 1100 for a predetermined period (corresponding to one clock) and outputting a delayed pixel, a fourth pixel delay means 1102 for delaying the input pixel D41 for a predetermined period (corresponding to 8 clocks) and outputting a delayed pixel, a fifth pixel delay means 1103 for delaying the output of the fourth pixel delay means 1102 for a predetermined period (corresponding to 8 clocks) and outputting a delayed pixel, a third selection means 1104 for selectively outputting the output of the first pixel delay means 1100 ("a" of the third selection means 1104 shown in FIG. 11) in the case of the "horizontal processing mode" and the output of the fourth pixel delay means 1102 ("b" of the third selection means 1104 shown in FIG. 11) in the case of the "vertical processing mode" in accordance with a mode switch signal S43 for switching the mode between the "horizontal processing mode" and "vertical processing mode", and a fourth selection means 1105 for selectively outputting the output of the second pixel delay means 1101 ("a" of the fourth selection means 1105 shown in FIG. 11) in the case of the "horizontal processing mode" and the output of the fifth pixel delay means 1103 ("b" of the fourth selection means 1105 shown in FIG. 11) in the case of the "vertical processing mode" in accordance with the mode switch signal S43 for switching the mode between the "horizontal processing mode" and "vertical processing mode".

Other structure, i.e., a multiplication means 1106, a left shift means 1107, a first selection means 1108, an addition means 1109, a second selection means 1110, a selection control signal generation means 1111, a third pixel delay means 1112, a right shift means 1113, and a shift amount control means 1114 are the same as the multiplication means 202, the left shift means 203, the first selection means 204, the addition means 205, the second selection means 206, the selection control signal generation means 207, the third pixel delay means 208, the right shift means 209, and the shift amount control means 210 which constitute the half-pixel motion compensation and intra-loop filtering means 100 involved in the filter operation apparatus A shown in the first embodiment, respectively. Therefore, these means are not described here. In addition, D42~D45 denote output data, S41 denotes a mode switch signal, S42 denotes a control signal, and S44 denotes a shift amount control signal. These are the same as the output data D2–D5, the mode switch signal S1, the control signal S2, and the shift amount control signal S4 as shown in FIG. 2, respectively.

The description is given of the operation in the horizontal processing of the half-pixel motion compensation and intra-loop filtering means 101 as shown in FIG. 11 in the case where the half-pixel motion compensation and intra-loop filtering means 101 is switched to the "horizontal processing mode" in accordance with the mode switch signal S43 for switching the mode between the "horizontal processing mode" and "vertical processing mode". The third selection means 1104 and the fourth selection means 1105 operate in the above-mentioned manners. Further, the half-pixel motion compensation and intra-loop filtering means 101 operates in the same manner as that of the half-pixel motion compensation and intra-loop filtering means 100 as shown in FIG. 2, which is described in the first embodiment. Therefore, the operation of the horizontal processing is not described here.

Then, the description is given of the operation in the vertical processing of the half-pixel motion compensation and intra-loop filtering means 101 as shown in FIG. 11 in the case where the half-pixel motion compensation and intra-loop filtering means 101 is switched to the "vertical processing mode" in accordance with the mode switch signal S43 for switching the mode between the "horizontal processing mode" and "vertical processing mode", with respect to the cases of half-pixel. motion compensation and intra-loop filtering, respectively.

The format of input data in the case of half-pixel motion compensation is described with reference to FIG. 3. As shown in FIG. 3(*b*), the format of input data which are subjected to the vertical processing for generating 8×8 half-pixels in the vertical processing consists of 9×9 pixels. As shown by arrows in FIG. 3(*b*), the processing is performed successively from left to right and from top to bottom on a two-dimensional space.

Figure 3:
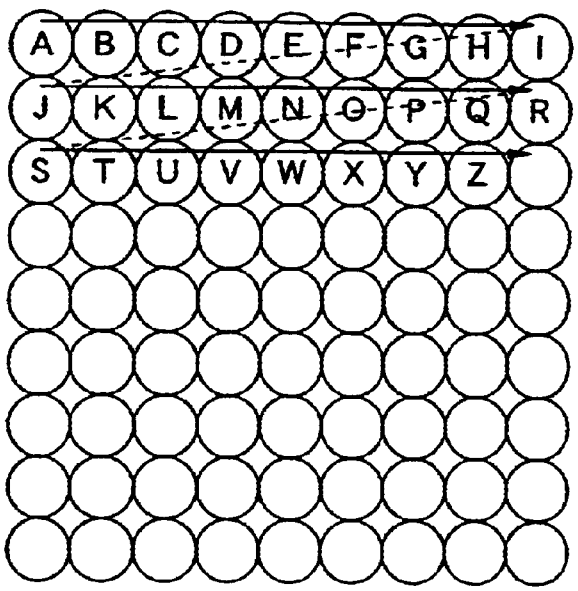
FIGS. 3 are diagrams showing the concepts of formats of input data which are subjected to the half-pixel motion compensation.
Figure 3:
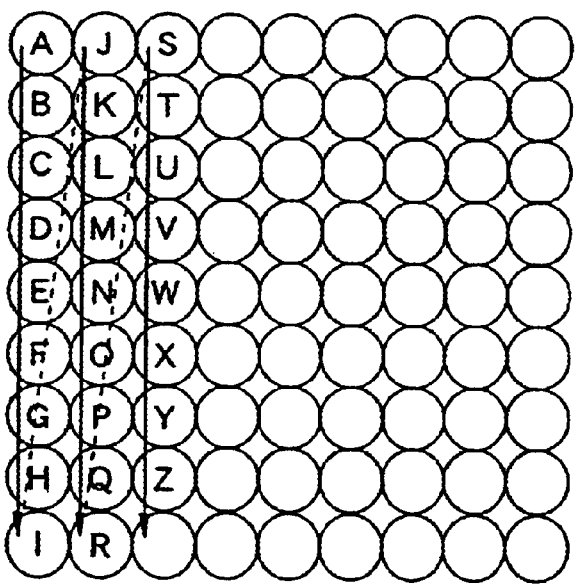

To be more specific, as shown in FIG. 3(*b*), the processing is performed in the order of A→B→C→ . . . →I→J→K→ . . . →Z. The timing charts of FIGS. 12 show this operation in more detail. In FIGS. 12, S41 denotes a control signal for controlling the first selection means 1108 shown in FIG. 11 to output "b" when the "half-pixel motion compensation mode" is turned ON. S42 denotes a control signal for controlling the second selection means 1110 shown in FIG. 11 to output "b". S43 denotes a control signal for switching the shift amount control means 1114 shown in FIG. 11 to the "vertical processing mode" and controlling the third selection means 1104 and the fourth selection means 1105 to output "b". S44 denotes a control signal for rightward-arithmetically shifting the output of the third pixel delay means 1112 shown in FIG. 11 by 1 bit (i.e., multiplying the output by ½).

The format of input data in the case of intra-loop filtering is described with reference to FIG. 4. The format of input data which are subjected to the vertical processing of the intra-loop filtering consists of 8×8 pixels as shown in FIG. 4(b). As shown by arrows in FIG. 4(b), the processing is performed successively from top to bottom and from left to right on a two-dimensional space.

To be more specific, as shown in FIG. 4(b), the processing is performed in the order of A→B→C→ . . . →F→G→H→I→J→ . . . →Z and values which are obtained by the vertical processing are input as shown in FIG. 7. The timing charts of FIGS. 13 show this operation in more detail. In FIGS. 13, S41 denotes a control signal for controlling the first selection means 1108 shown in FIG. 11 to output "a" when the "intra-loop filtering mode" is turned ON. S42 denotes a control signal for controlling the second selection means 1110 shown in FIG. 11 to output "a" during the period of times t8~t16, output "b" during the period of t16~t64, output "a" during the period of t64~t72, and thereafter repeat the above-mentioned operations of t8~t72. S43 denotes a control signal for switching the shift amount control signal 1114 shown in FIG. 11 to the "vertical processing mode" and controlling the third selection means 1104 and fourth selection means 1105 to output "a". S44 denotes a control signal for rightward-arithmetically shifting the output of the third pixel delay means 1112 shown in FIG. 11 by 4 bits (i.e., multiplying the output by 1/16).

As described above, also in the apparatus which cannot perform the processing successively from top to bottom and from left to right as shown in FIG. 4(b) or 3(b) but is capable of only the processing successively from left to right and from top to bottom as shown in FIG. 4(a) or 3(a), one apparatus can perform the processing in the horizontal direction and vertical direction. Therefore, the scale of hardware can be reduced.

Industrial Availability

The above-mentioned filter operation apparatus according to the present invention is greatly useful as an apparatus which can share the operation unit in the horizontal processing unit and the vertical processing unit in the processing of half-pixel motion compensation and intra-loop filtering for input pixel data, thereby reducing the scale of hardware.

What is claimed is:

1. A filter operation apparatus for processing input pixel data according to one of a first filter processing and a second filter processing which is different from the first filter processing, comprising at least:

first pixel delay means for delaying the input pixel data for a predetermined period and outputting the delayed data;

second pixel delay means for delaying the output data of the first pixel delay means for a predetermined period and outputting the delayed data;

first multiplication means for multiplying the output data of the first pixel delay means by four and outputting the multiplied data;

filter processing switch signal generation means for generating a filter processing switch signal for performing switching to process the input pixel data according to one of the first filter processing and the second filter processing;

second multiplication means for. multiplying the output data of the first pixel delay means by one when the input pixel data are processed according to the first filter processing in accordance with the filter processing switch signal, and multiplying the output data of the first pixel delay means by two when the input pixel data are processed according to the second filter processing in accordance with the filter processing switch signal;

first selection means for selectively outputting one of "0" and the output data of the second pixel delay means in accordance with the filter processing switch signal;

addition means for adding the input pixel data, the output data of the second multiplication means, and the output data of the first selection means;

selection control signal generation means for outputting a selection control signal in accordance with the filter processing switch signal;

second selection means for selectively outputting one of the output data of the first multiplication means and the output data of the addition means in accordance with the selection control signal;

mode switch signal output means for outputting a mode switch signal for switching a mode between a horizontal processing mode in which the input pixel data are processed in a horizontal direction and a vertical processing mode in which the input pixel data are processed in a vertical direction;

multiplier factor control signal generation means for outputting a multiplier factor control signal on the basis of the filter processing switch signal and the mode switch signal;

third pixel delay means for delaying the output data of the second selection means for a predetermined period and outputting the delayed data; and third multiplication means for multiplying the output data of the third pixel delay means by one of one, ½, and 1/16 in accordance with the multiplier factor control signal which is output by the multiplier factor control signal generation means.

2. The filter operation apparatus of claim 1 wherein the addition means add an output of a register which contains values for performing "rounding", to one of an operation result of the first filter processing, an operation result of the second filter processing, an operation result of a horizontal processing mode in which the input pixel data are processed in a horizontal direction, and an operation result of a vertical processing mode in which the input pixel data are processed in a vertical direction.

3. The filter operation apparatus of claim 1 comprising:

fourth pixel delay means for delaying the input pixel data for a predetermined period which is at least equal to or longer than the delay time of the first pixel delay means, and outputting the delayed data;

fifth pixel delay means for delaying the output data of the fourth pixel delay means for a period which is as long as the delay time of the fourth pixel delay means, and outputting the delayed data;

third selection means for selectively outputting one of the output data of the first pixel delay means and the output data of the fourth pixel delay means, in place of the output data of the first pixel delay means, to the first multiplication means and the second multiplication means, in accordance with the mode switch signal; and fourth selection means for selectively outputting one of the output data of the second pixel delay means and the output data of the fifth pixel delay means, in place of the output data of the second pixel delay means, to the first selection means.

* * * * *